(12) United States Patent
Reynolds

(10) Patent No.: US 7,198,309 B2
(45) Date of Patent: Apr. 3, 2007

(54) VEHICLE BUMPER

(75) Inventor: Christopher Reynolds, West Bloomfield, MI (US)

(73) Assignee: Nissan Technical Center North America, Inc. MI (US)

( * ) Notice: Subject to any disclaimer, the term of this patent is extended or adjusted under 35 U.S.C. 154(b) by 0 days.

(21) Appl. No.: 11/086,438

(22) Filed: Mar. 23, 2005

(65) Prior Publication Data
US 2006/0214439 A1 Sep. 28, 2006

(51) Int. Cl.
*B60R 19/03* (2006.01)
(52) U.S. Cl. ............................. 293/122; 293/120
(58) Field of Classification Search ............... 293/120, 293/121, 122
See application file for complete search history.

(56) References Cited

U.S. PATENT DOCUMENTS

| | | | |
|---|---|---|---|
| 4,079,975 A | 3/1978 | Matsuzaki et al. | |
| 4,830,416 A | 5/1989 | Matsuoka | |
| 4,974,891 A | 12/1990 | Furuta | |
| 6,106,039 A | 8/2000 | Maki | |
| 6,308,999 B1 | 10/2001 | Tan et al. | |
| 6,428,065 B2 * | 8/2002 | Sato et al. | 293/121 |
| 2002/0180224 A1 * | 12/2002 | Mansoor et al. | 293/120 |
| 2003/0111852 A1 | 6/2003 | Carley et al. | |

* cited by examiner

*Primary Examiner*—Joseph D. Pape
(74) *Attorney, Agent, or Firm*—Global IP Counselors

(57) ABSTRACT

A vehicle bumper is disclosed that includes a first vehicle mounting member, a second vehicle mounting member and an elongated energy absorbing structure. The first and second vehicle mounting members are configured to be attached to a vehicle at horizontally spaced apart locations and to support the vehicle bumper. The elongated energy absorbing structure is movably attached to both of the vehicle mounting members to linearly deform and torsionally deform with respect to the mounting members in response to a vehicular impact. The vehicle bumper absorbs energy linearly and torsionally in response to vehicular impact.

20 Claims, 15 Drawing Sheets

VEHICLE BUMPER

BACKGROUND OF THE INVENTION

1. Field of the Invention

The present invention generally relates to a vehicle bumper having an energy absorbing structure. More specifically, the present invention relates to a vehicle bumper having an elongated energy absorbing structure that is movably attached to the vehicle to linearly deform and torsionally deform in response to a vehicular impact.

2. Background Information

Conventional bumpers on vehicles are designed to respond to vehicular impacts by absorbing energy through linear displacement. Such bumpers typically include a rigid structural member and an elastic member attached to the rigid structural member. The elastic member absorbs low energy impacts in much the same way a spring, e.g., linearly compresses in response to low energy impacts, during low speed impacts. For higher speed impacts, the rigid structural member and the elastic member may both be deform linearly to absorb the energy from the impact. In such higher speed impacts, the rigid structural member is permanently deformed. Such absorption of energy generally involves only linear displacement of both the elastic member and the rigid structural member.

It is always desirable to improve the energy absorbing capabilities of a vehicle bumper. Over the years, the vehicle bumpers have improved with the improvement of new materials and/or the improvement in designs. However, conventional bumpers only absorb energy in a linear manner. It is desirable to have an energy absorbing configuration that can absorb additional energy to minimize damage to a vehicle in low speed impacts and protect passengers within the vehicle in high speed impacts.

In view of the above, it will be apparent to those skilled in the art from this disclosure that there exists a need for an improved bumper that absorbs additional energy from vehicular impact. This invention addresses this need in the art as well as other needs, which will become apparent to those skilled in the art from this disclosure.

SUMMARY OF THE INVENTION

It has been discovered that conventional bumpers are designed to absorb the energy of vehicular impact in a primarily linear manner. In view of this realization and the other factors mentioned above, one object of the present invention is to provide an energy absorbing structure for a vehicle bumper that includes both torsional energy absorption and linear energy absorption capabilities.

In accordance with one aspect of the present invention, a vehicle bumper includes a first vehicle mounting member, a second vehicle mounting member and an elongated energy absorbing structure. The first and second vehicle mounting members are configured to be attached to a vehicle at horizontally spaced apart locations. The elongated energy absorbing structure is movably attached to both of the vehicle mounting members to linearly deform and torsionally deform with respect to the mounting members in response to a vehicular impact.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
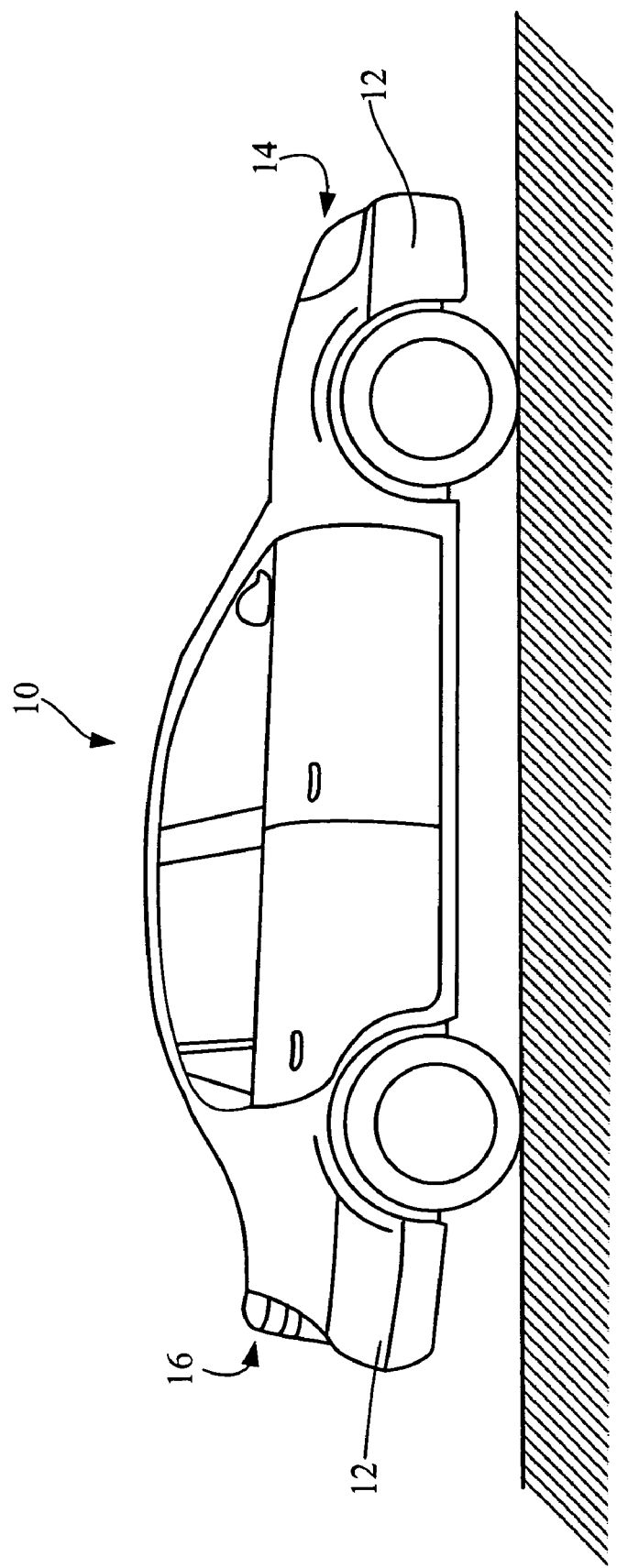
FIG. 1 is a side elevational view of a vehicle having front and rear vehicle bumpers, with each of the vehicle bumpers having an energy absorbing structure in accordance with a first embodiment of the present invention.

Referring initially to FIG. 1, a vehicle 10 is illustrated in accordance with a first embodiment of the present invention. The vehicle 10 includes two (front and rear) vehicle bumpers 12 that are arranged configured for both linear and torsional displacement in response to vehicular impact, in accordance with one embodiment of the present invention. The vehicle bumpers 12 are located at a front end 14 and a rear end 16 of the vehicle 10. The vehicle bumpers 12 can have slightly different shapes and/or contours corresponding to differences between the front end 14 and the rear end 16 of the vehicle 10. However, the vehicle bumpers 12 of the vehicle 10 are structurally and functionally equivalent with respect to each other in accordance with the present invention. Specifically, in response to low velocity vehicular impacts, the vehicle bumpers 12 are arranged and configured to absorb energy to minimize or avoid damage to the remainder of the vehicle 10. In response to higher velocity vehicular impacts, the vehicle bumpers 12 provide additional protection for passengers in the vehicle 10 by absorbing appreciable amounts of energy upon impact and reducing the amount of linear displacement of the vehicle bumper 12 with respect to the remainder of the vehicle 10.

Since the vehicle bumpers 12 are generally structurally and functionally the same, only the vehicle bumper 12 at the front end 14 of the vehicle 10 will be described below. However, it should be understood from the drawings and description herein that the description of the front bumper 12 applies to the construction and assembly of both of the bumpers 12.

Figure 2:
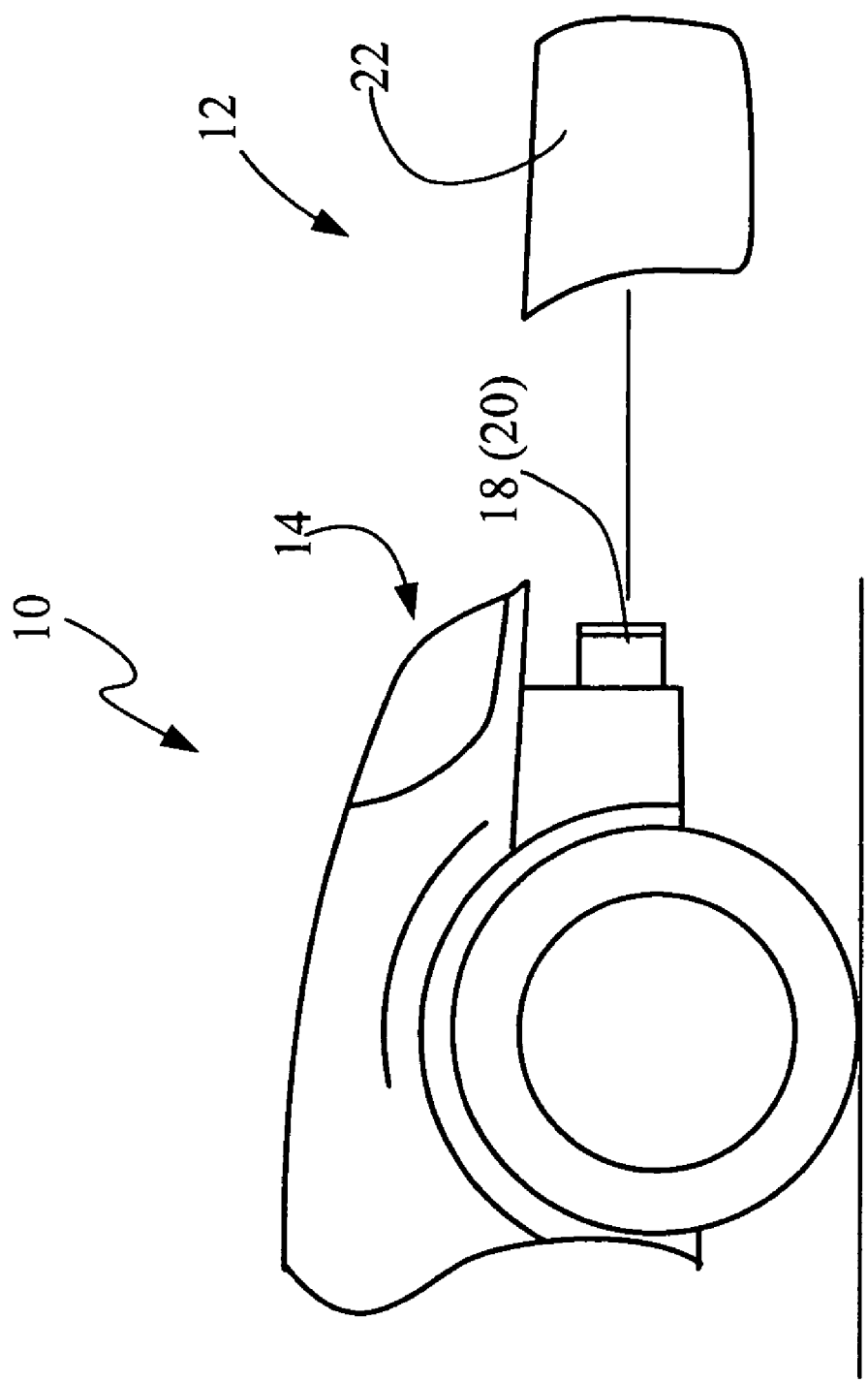
FIG. 2 is an exploded side elevational view of a front portion of the vehicle depicted in FIG. 1, showing an outer bumper cover removed to reveal portions of the energy absorbing structure of the front vehicle bumper in accordance with the present invention.
Figure 3:
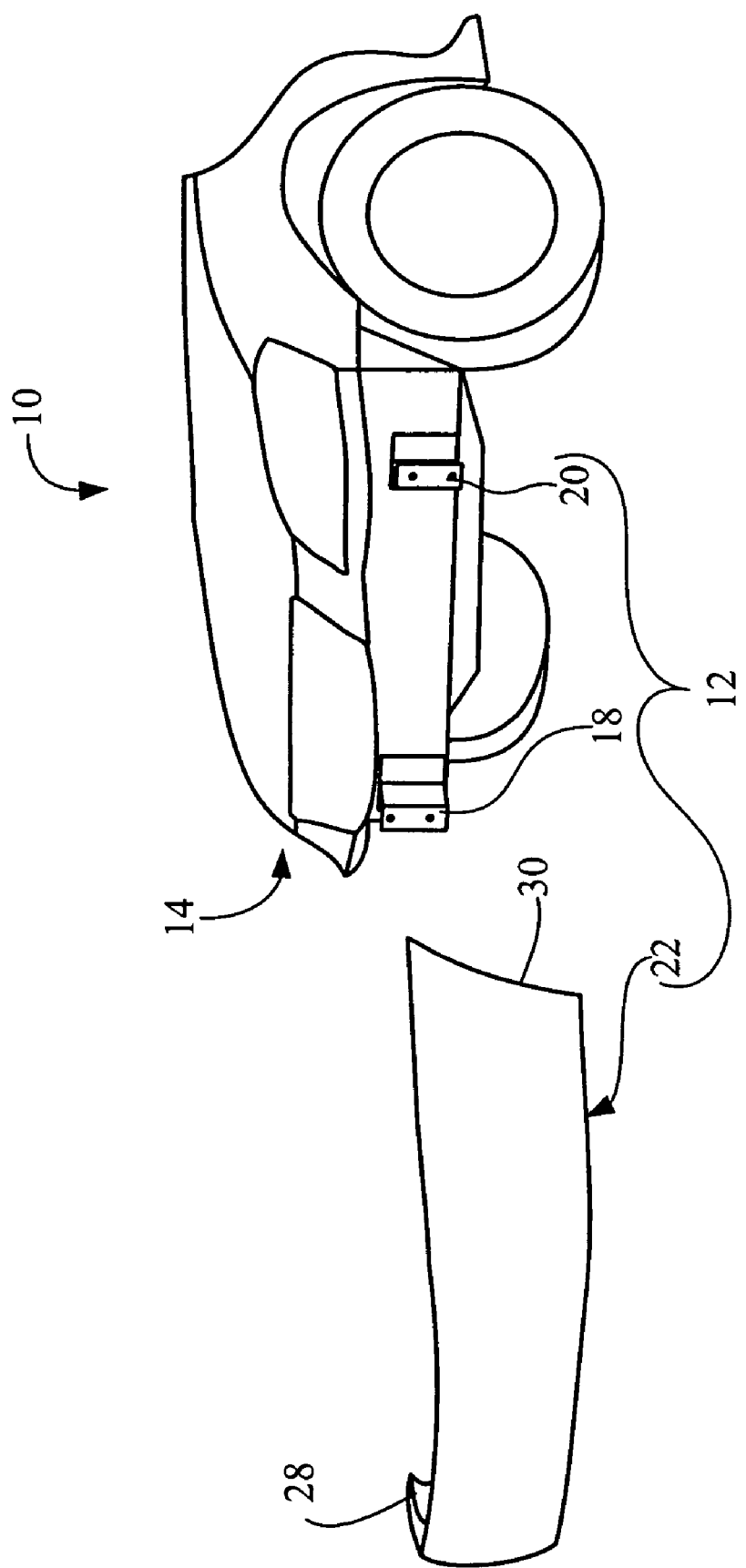
FIG. 3 is an exploded perspective view of the front portion of the vehicle depicted in FIGS. 1 and 2, with the front vehicle bumper removed to show mounting portions of the energy absorbing structure in accordance with the present invention.

As shown in FIGS. 2 and 3, the vehicle bumper 12 basically includes a first vehicle mounting member 18, a second vehicle mounting member 20 and an elongated energy absorbing structure 22. The elongated energy absorbing structure 22 of the present invention is configured and arranged to absorb energy from vehicular impact with linear deformation and torsional deformation.

Figure 10:
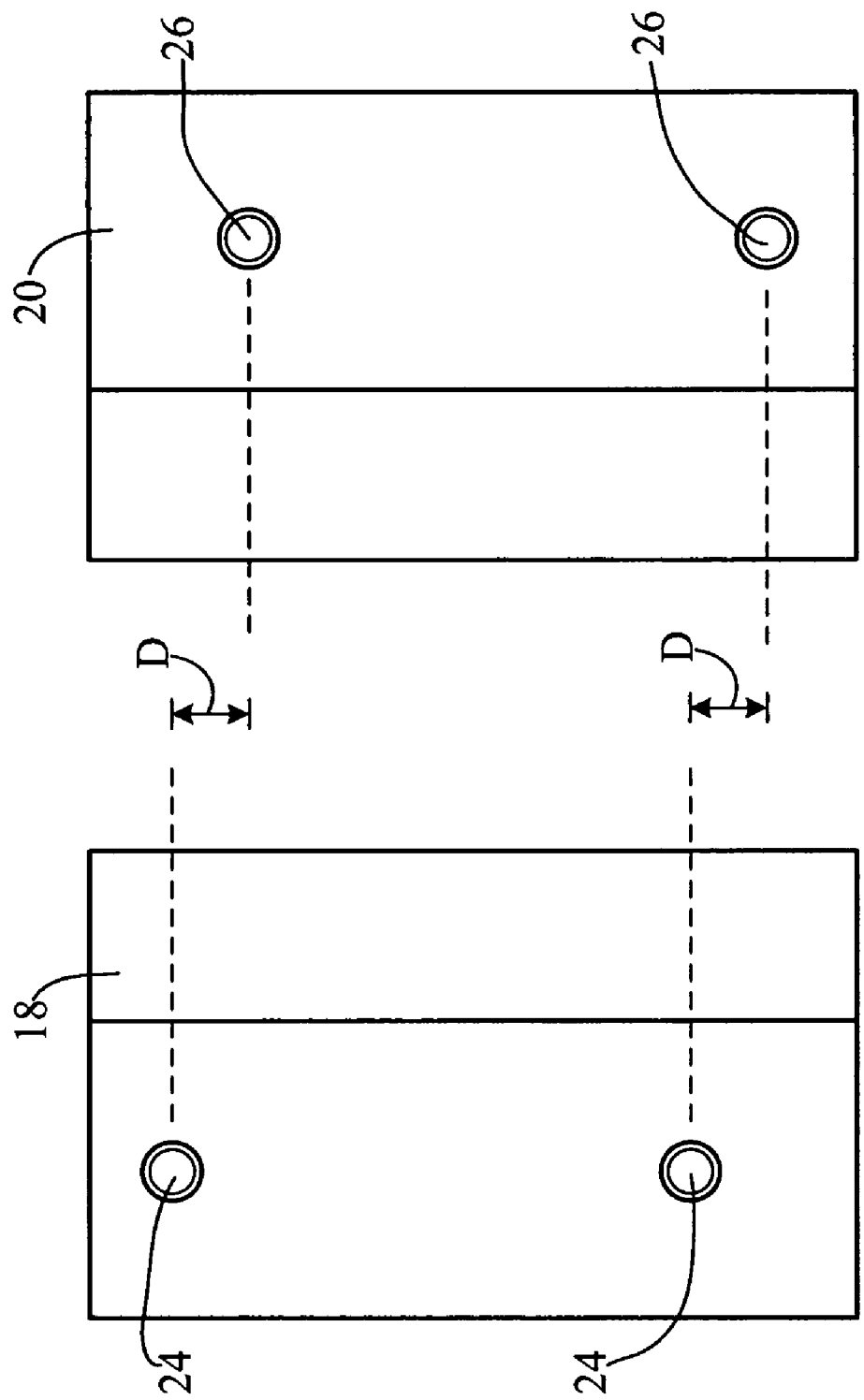
FIG. 10 is a front elevational view of the two mounting members showing the offset threaded apertures in accordance with the present invention.
Figure 11:
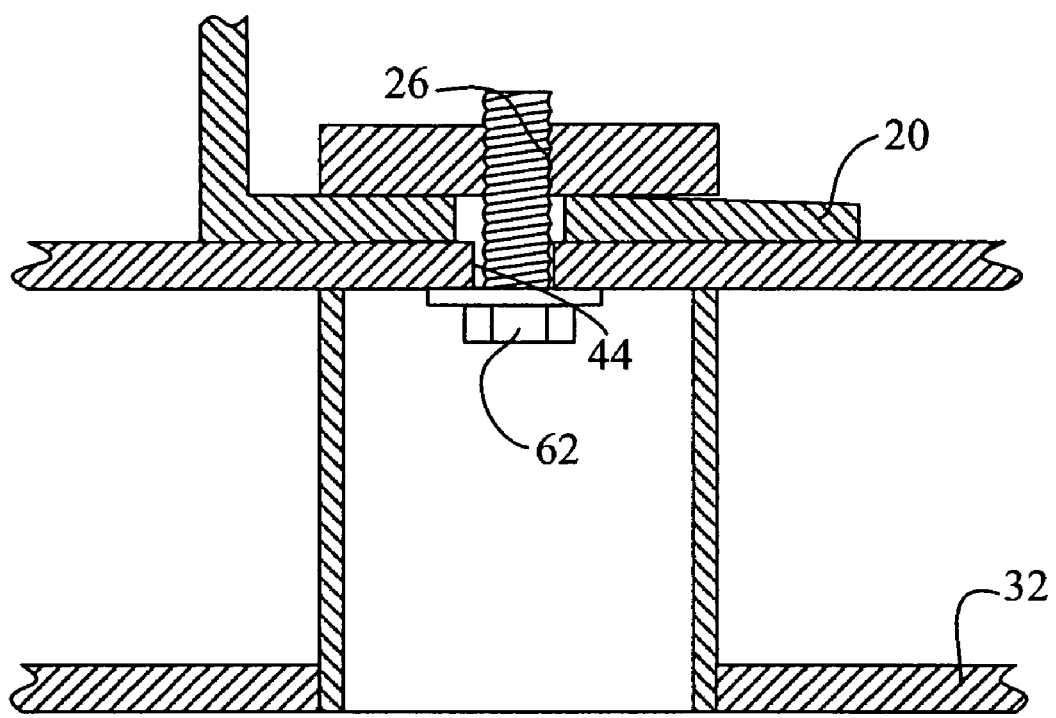
FIG. 11 is a cross-sectional view of the upper rigid reinforcing member and one of the mounting members taken along section line 11—11 in FIG. 5 in accordance with the present invention.
Figure 12:
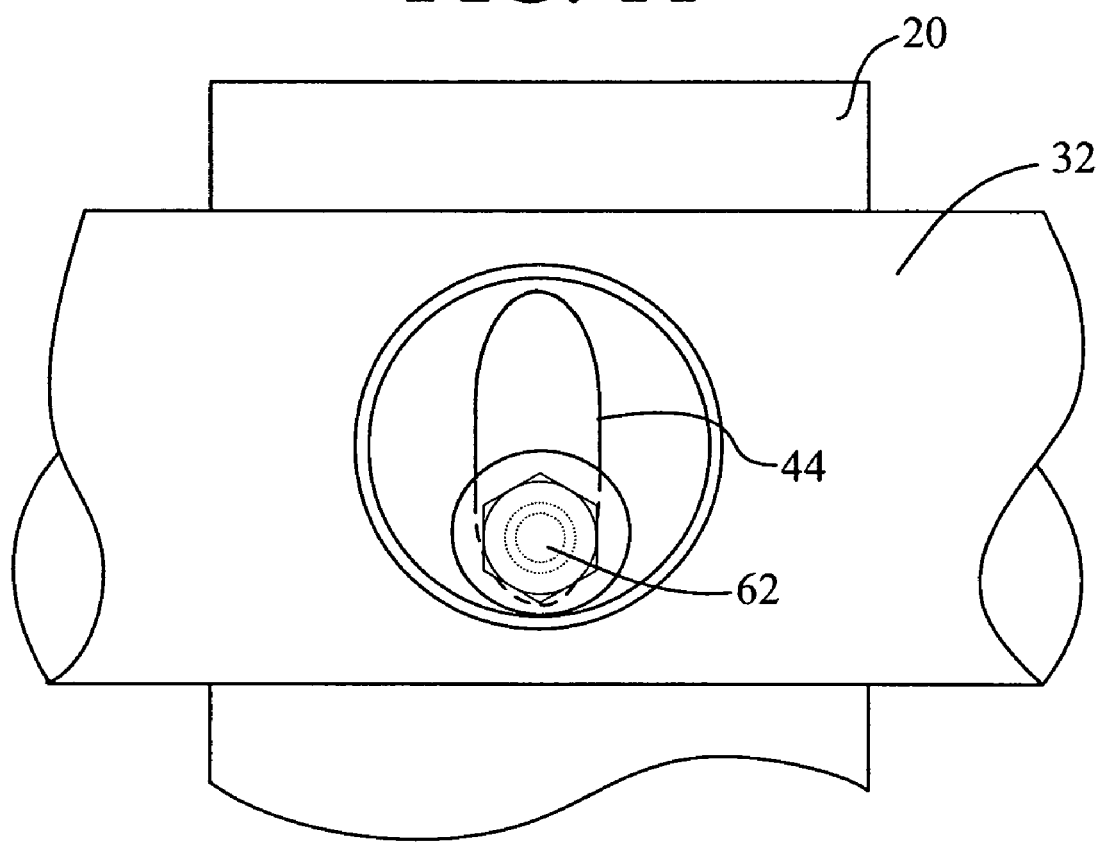
FIG. 12 is a fragmentary front elevational view of one of the upper rigid reinforcing member and the fastener fixing it to the mounting member in accordance with the present invention.

As shown in FIGS. 2 and 3, the first vehicle mounting member 18 is preferably a bracket that fixedly attaches to one side of the front end 14 of the vehicle 10. The first vehicle mounting member 18 supports one end of the elongated energy absorbing structure 22. The first vehicle mounting member 18 is a separate member that is fixed to a structural portion of the vehicle 10 in a conventional manner. Alternatively, the first vehicle mounting member 18 can be an integral portion of the structure of the vehicle 10 if needed and/or desired. As shown in FIG. 10, the first vehicle mounting member 18 is formed with two threaded apertures 24 that are generally vertically aligned and are spaced apart from one another.

As shown in FIGS. 2 and 3, the second vehicle mounting member 20 is preferably a bracket that fixedly attaches to a side of the front end 14 of the vehicle 10 opposite the attachment side of the first vehicle mounting member 18. Thus, the second vehicle mounting member 20 supports the other end of the elongated energy absorbing structure 22 that is opposite the first vehicle mounting member 18. The second vehicle mounting member 20 is also separate member, similar to first vehicle mounting member 18, which is fixed to a structural portion of the vehicle 10. Alternatively, the second vehicle mounting member 20 can be an integral portion of the structure of the vehicle 10 if needed and/or desired. As shown in FIG. 10, the second vehicle mounting member 20 is formed with two threaded apertures 26 that are generally vertically aligned and are spaced apart from one another. As also shown in FIG. 10, the threaded apertures 26 of the second vehicle mounting member 20 are vertically offset from the threaded aperture 24 of the first vehicle mounting member 18 by a distance D. Specifically, the threaded apertures 24 of the first vehicle mounting member 18 are upwardly offset and the threaded apertures 26 are downwardly offset by the distance D.

Figure 6:
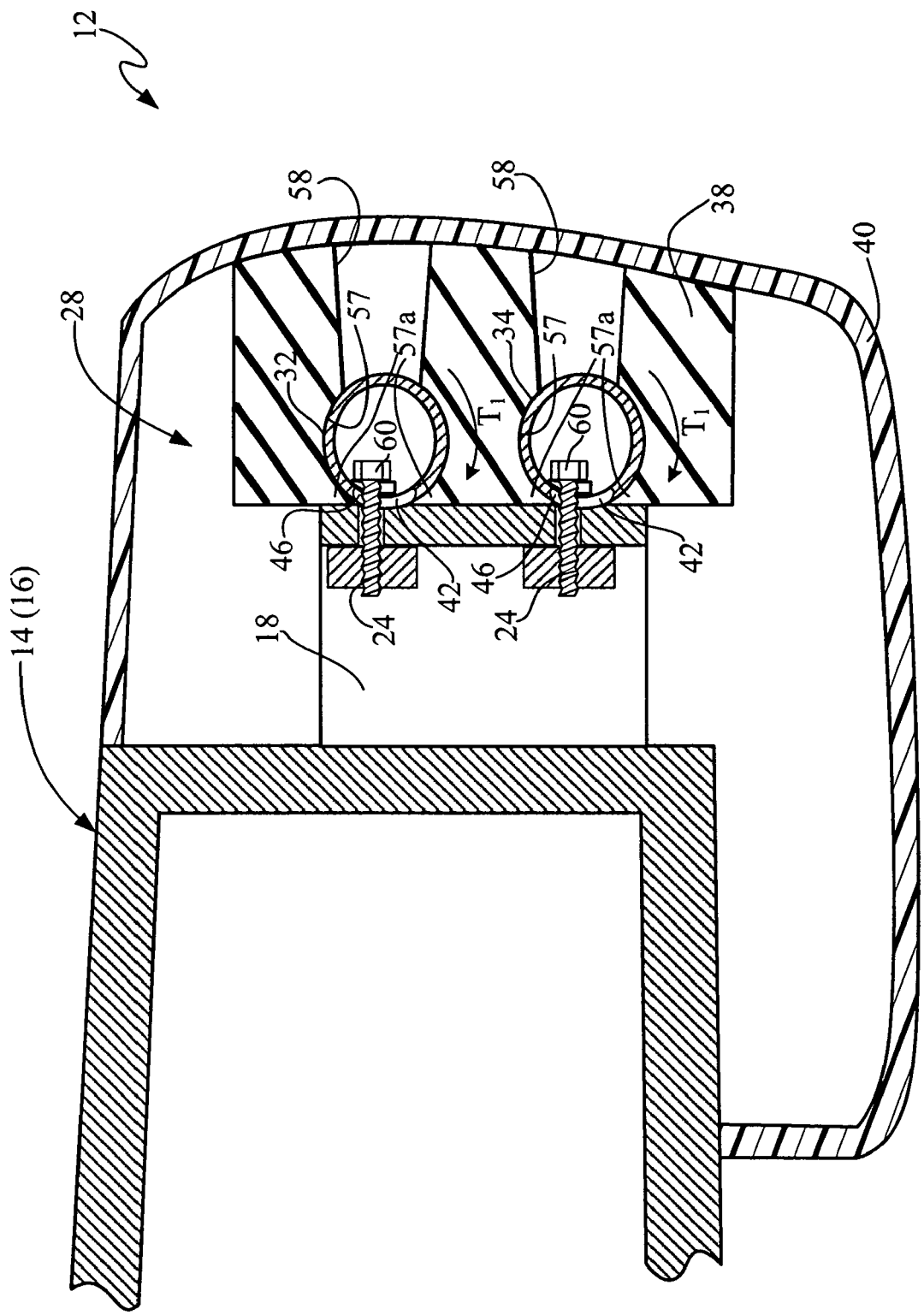
FIG. 6 is a transverse cross-sectional view of the front vehicle bumper taken along section line 6—6 in FIG. 5 to show selected features of the energy absorbing structure in accordance with the present invention.
Figure 7:
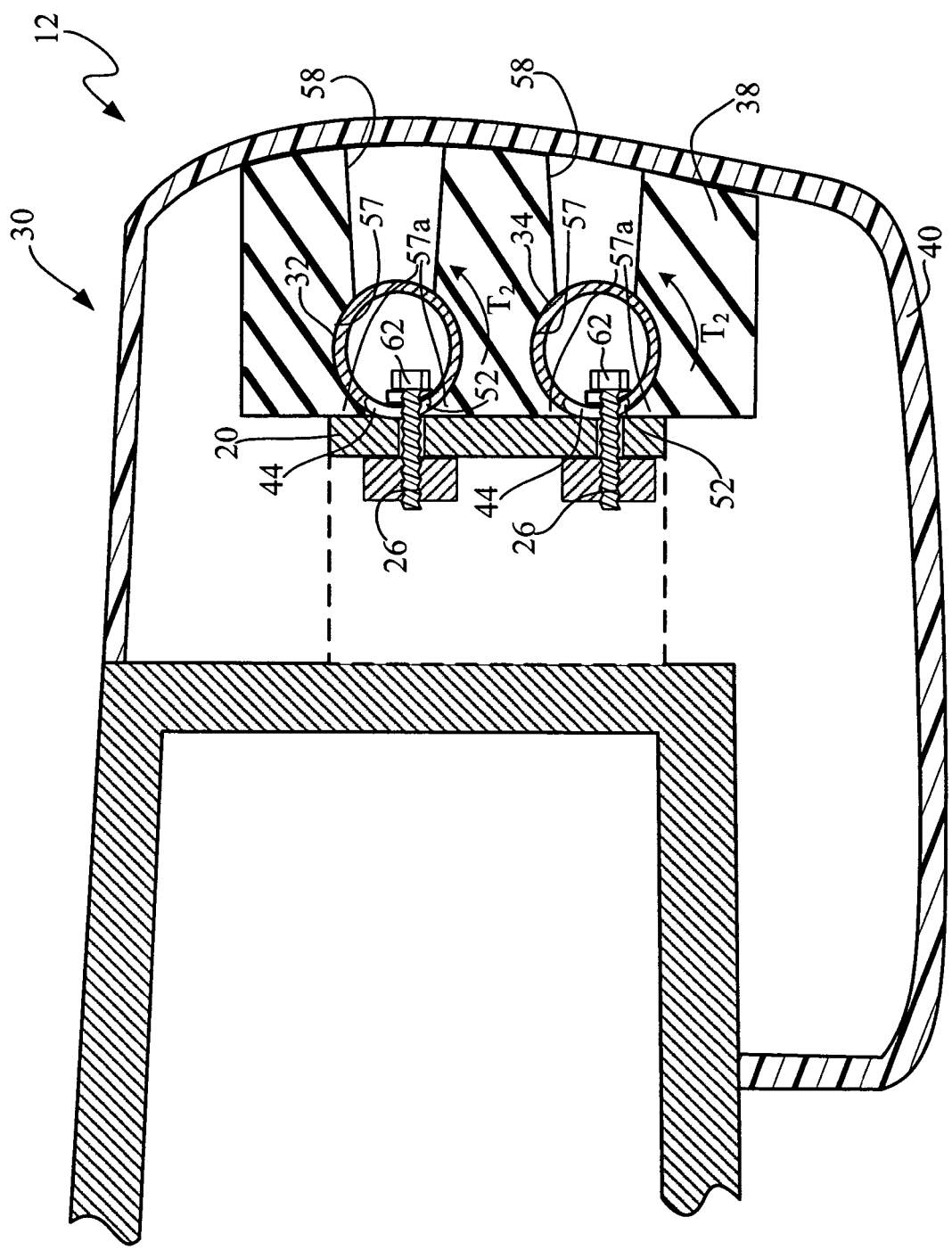
FIG. 7 is a cross-sectional side view of the front vehicle bumper taken along section line 7—7 in FIG. 5 to show selected features of the energy absorbing structure in accordance with the present invention.

As described in greater detail below, the elongated energy absorbing structure 22 is movably attached to the first and second vehicle mounting members 18 and 20 to linearly deform and torsionally deform with respect to the first and second vehicle mounting members 18 and 20 in response to a vehicular impact. As shown in FIGS. 3, 6 and 7, the elongated energy absorbing structure 22 has a first end 28 (FIG. 6) and a second end 30 (FIG. 7). The first end 28 is supported by the first vehicle mounting member 18 and the second end 30 is supported by the second vehicle mounting member 20.

Figure 4:
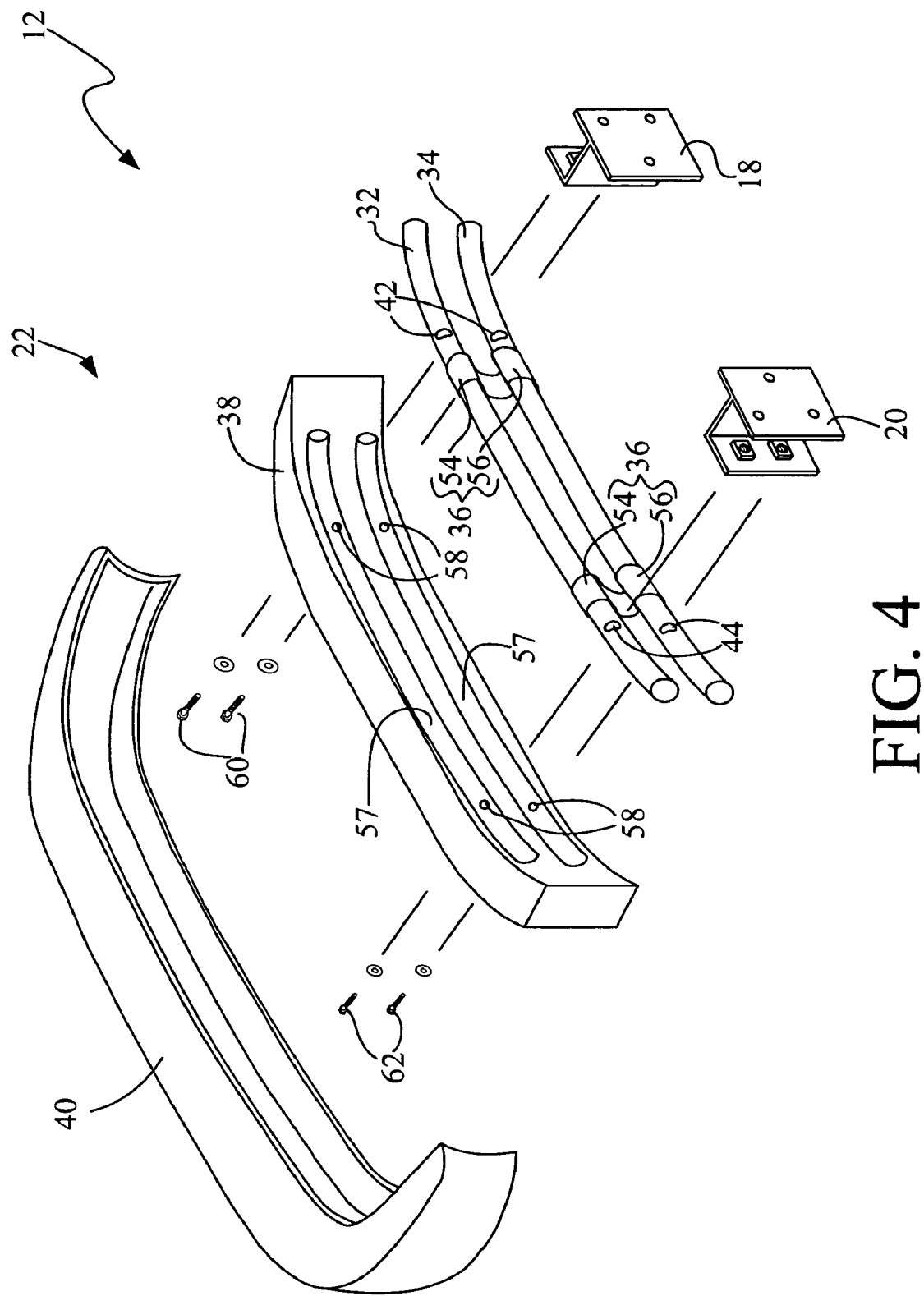
FIG. 4 is an exploded perspective view of the front vehicle bumper showing a pair of mounting members, and the energy absorbing structure (a pair of rigid reinforcing members, a compressible member and the outer bumper cover) in accordance with the present invention.

Referring now to FIG. 4, the elongated energy absorbing structure 22 basically includes an upper rigid reinforcing member or tube 32, a lower rigid reinforcing member or tube 34, a pair of connector elements 36, a compressible member 38 and an outer bumper cover 40.

The upper and lower rigid reinforcing members 32 and 34 are held together in a vertically spaced apart relationship by the connector elements 36 with respect to the first and second vehicle mounting members 18 and 20, as described in greater detail below. The upper and lower rigid reinforcing members 32 and 34 are preferably made of a metal material. The material of the upper and lower rigid reinforcing members 32 and 34 is at least plastically deformable in both a torsional direction and a transverse linear direction with respect to the center longitudinal axes upper and lower rigid reinforcing members 32 and 34.

The lower rigid reinforcing member 34 extends generally parallel to the upper rigid reinforcing member 32 in a generally horizontal direction. The upper rigid reinforcing member 32 and the lower rigid reinforcing member 34 are fixedly attached to the first and second vehicle mounting members 18 and 20 to twist with respect to the mounting members in response to the vehicular impact, as described in greater detail below.

The upper rigid reinforcing member 32 and the lower rigid reinforcing member 34 are generally the same and description of one applies to the other. Thus for the sake of brevity, only one of the upper and lower rigid reinforcing members 32 and 34 will be discussed and illustrated in greater detail.

The upper rigid reinforcing member 32 is basically an elongated tube or rod-like member that is preferably hollow to provide torsional displacement in response to a vehicular impact. The upper rigid reinforcing member 32 is preferably formed of any one of the following: a high strength steel that can be roll formed, generic steels (i.e. 1010 or 1008) or aluminum. The upper rigid reinforcing member 32 is formed with a first vertically elongated retaining aperture 42 disposed closer to the first end 28 of the elongated energy absorbing structure 22 than the second end 30 of the elongated energy absorbing structure 22. The upper rigid reinforcing member 32 is also formed with a second vertically elongated retaining aperture 44 disposed closer to the second end 30 of the elongated energy absorbing structure 22 than the first end 28 of the elongated energy absorbing structure 22. Since the upper rigid reinforcing member 32 and the lower rigid reinforcing member 34 are generally the same, the lower rigid reinforcing member 34 is provided with the same first and second vertically elongated retaining apertures 42 and 44.

Figure 9:
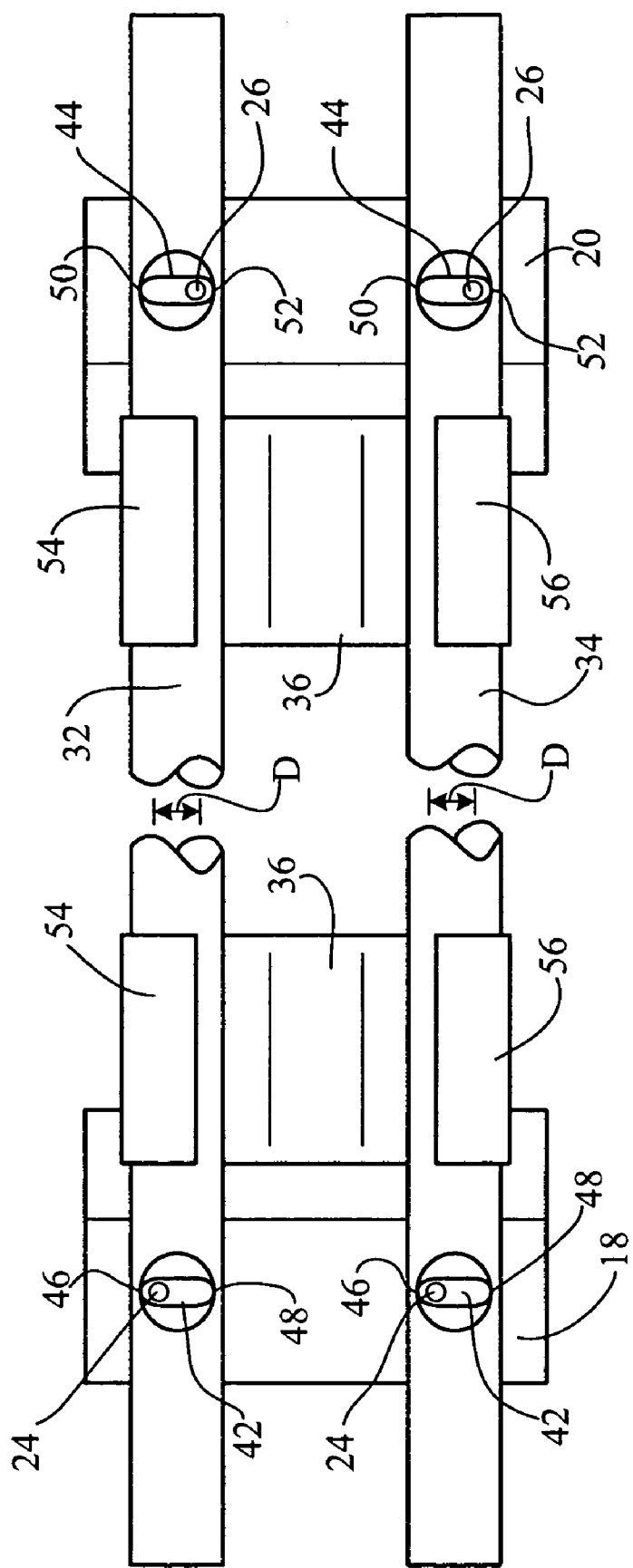
FIG. 9 is a fragmentary front elevational view of selected parts of the front vehicle bumper similar to FIG. 8, but with fasteners removed to reveal offset threaded apertures in the mounting members in accordance with the present invention.

Each of the first vertically elongated retaining apertures 42 has an upper end 46 and a lower end 48, as best shown in FIG. 9. Similarly, each of the second vertically elongated retaining apertures 44 has an upper end 50 and a lower end 52, as also shown in FIG. 9. The first and second vertically elongated retaining apertures 42 and 44 are horizontally aligned in each of the upper and lower rigid reinforcing members 32 and 34. Specifically, the first and second vertically elongated retaining apertures 42 and 44 in the upper rigid reinforcing member 32 are at the same horizontal level with respect to the vehicle 10. Further, the first and second vertically elongated retaining apertures 42 and 44 in the lower rigid reinforcing member 34 are at the same horizontal level with respect to the vehicle 10.

As shown in FIG. 9, the first vertically elongated apertures 42 in each of the upper and lower rigid reinforcing members 32 and 34 are preferably vertically aligned with one another. Specifically, the first vertically elongated apertures 42 in the upper rigid reinforcing member 32 are directly above the first vertically elongated apertures 42 in the lower rigid reinforcing member 34. Similarly, the second vertically elongated apertures 44 in each of the upper and lower rigid reinforcing members 32 and 34 are vertically aligned with one another.

The connector elements 36 are horizontally spaced apart from one another. One of the connector elements 36 is disposed adjacent to the first vertically elongated apertures 42, and the other connector element 36 is disposed adjacent to the second vertically elongated apertures 44, as shown in FIGS. 4, 5, 8 and 9. The connector elements 36 extend between the upper and lower rigid reinforcing members 32 and 34 to hold the upper and lower rigid reinforcing members 32 and 34 together with a small amount of friction. Thus, the connector elements 36 are coupled to the upper and lower rigid reinforcing members 32 and 34 to maintain the upper and lower rigid reinforcing members 32 and 34 in the vertically spaced apart relationship without restraining of rotational movement of the upper and lower rigid reinforcing members 32 and 34 during a vehicular impact.

Figure 13:
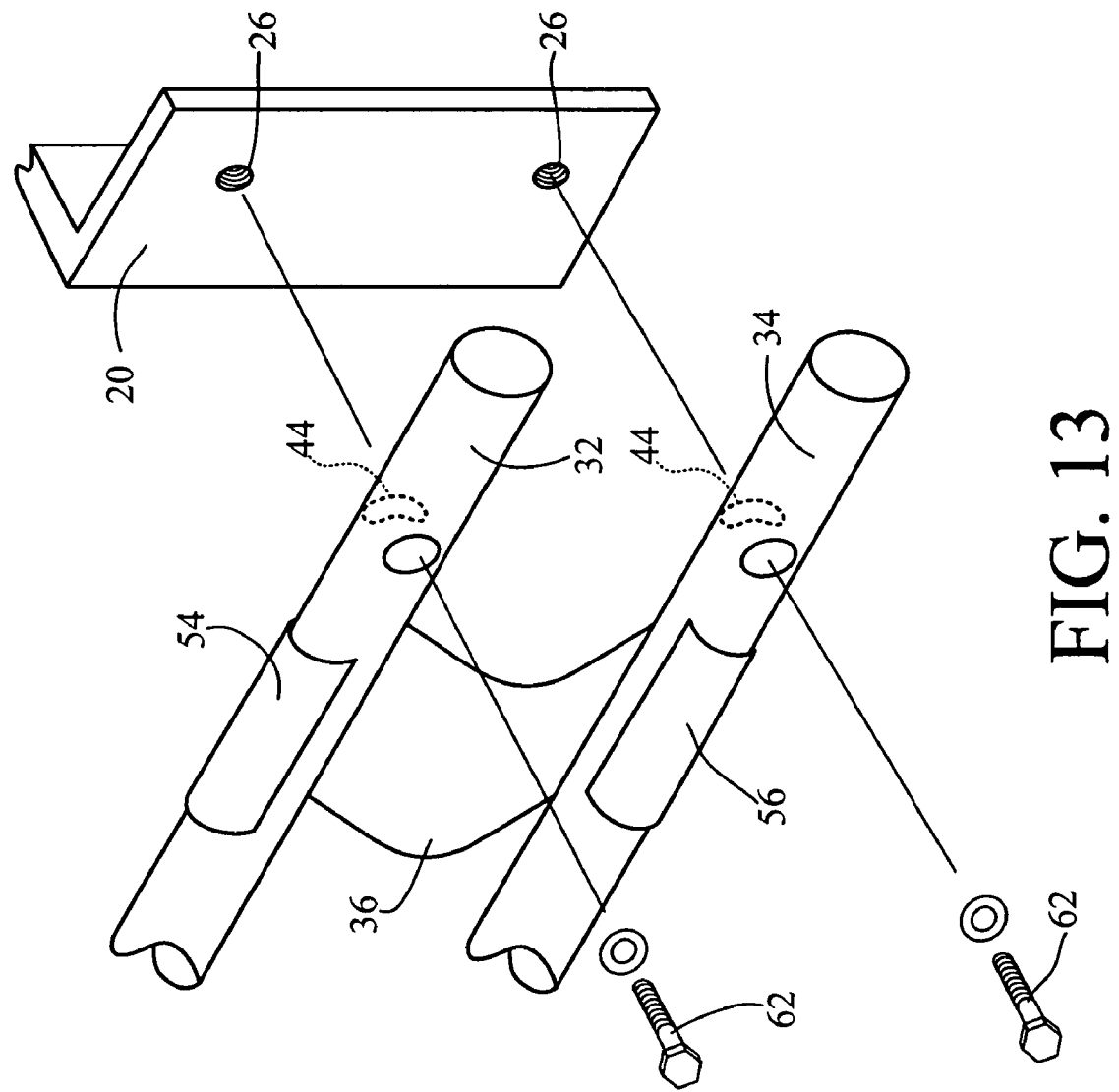
FIG. 13 is an exploded perspective view of one end of the energy absorbing structure that shows the attachment between one of the mounting members and one end of each of the rigid reinforcing members in accordance with the present invention.

Each of the connector elements 36 is preferably formed of a sheet metal material that is deformed to wrap at least partially around each of the upper and lower rigid reinforcing members 32 and 34. Each connector element 36 has an upper end portion 54 and a lower end portion 56. The upper end portion 54 is press fitted to wrap partially around the upper rigid reinforcing member 32, as shown in FIGS. 4 and 13. Similarly, the lower end portion 56 is press fitted to wrap part way around the lower rigid reinforcing member 34.

The compressible member 38 is preferably a highly elastically deformable and compressible material that is disposed at least primarily on an opposite side of the upper and lower rigid reinforcing members 32 and 34 from the first and second vehicle mounting members 18 and 20. The compressible member 38 is constructed of a material that is more easily deformable material than the material that forms the upper and lower rigid reinforcing members 32 and 34. The compressible member 38 is made of a foam material that is elastically compressible. The compressible member 38 is formed with recesses 57 (FIG. 4) that at least partially encapsulates the upper and lower rigid reinforcing members 32 and 34. The edges of the recesses 57 are formed with ribs 57a that retain the compressible member 38 on the upper and lower rigid reinforcing members 32 and 34. The compressible member 38 is further formed with fastening apertures 58 that are approximately aligned with the first and second vertically elongated retaining apertures 42 and 44. The compressible member 38 can be formed as a separate member held in place by the ribs 57a (as shown), or can be molded around the upper and lower reinforcing members 32 and 34 such that they form an integral unit. In other words, the compressible member 38 can be a separately attachable member as shown or a member that is molded on to the upper and lower rigid reinforcing members 32 and 34 and the connector elements 36.

The elongated energy absorbing structure 22 is attached to the first and second vehicle mounting members 18 and 20 by a pair of first fasteners 60 and a pair of second fasteners 62. The first fasteners 60 fix the first end 28 of the elongated energy absorbing structure 22 to the vehicle 10. The first fasteners 60 extend through the first vertically elongated retaining apertures 42 formed in each of the upper and lower rigid reinforcing members 32 and 34. The first fasteners 60 are further threaded into the threaded apertures 24 formed in the first vehicle mounting member 18. As should be apparent from FIG. 6, the first fasteners 60 are accessible via the fastening apertures 58 formed in the compressible member 38.

The second fasteners 62 fix the second end 30 of the elongated energy absorbing structure 22 to the vehicle 10. The second fasteners 62 extend through the second vertically elongated retaining apertures 44 formed in each of the upper and lower rigid reinforcing members 32 and 34. The second fasteners 60 are further threaded into the threaded apertures 26 formed in the second vehicle mounting member 20. As should be apparent from FIG. 7, the second fasteners 62 are accessible via the fastening apertures 58 formed in the compressible member 38.

Figure 5:
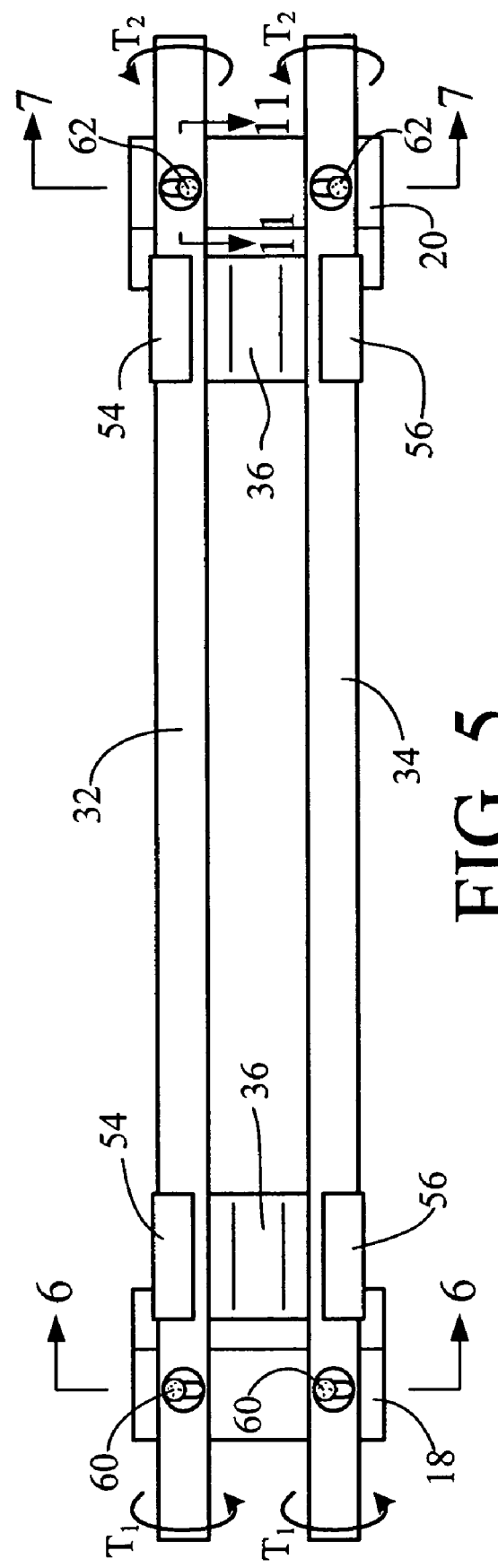
FIG. 5 is a front elevational view of selected parts of the front vehicle bumper with the outer bumper cover and the compressible member removed to show the rigid reinforcing members attached to the mounting members in accordance with the present invention.
Figure 8:
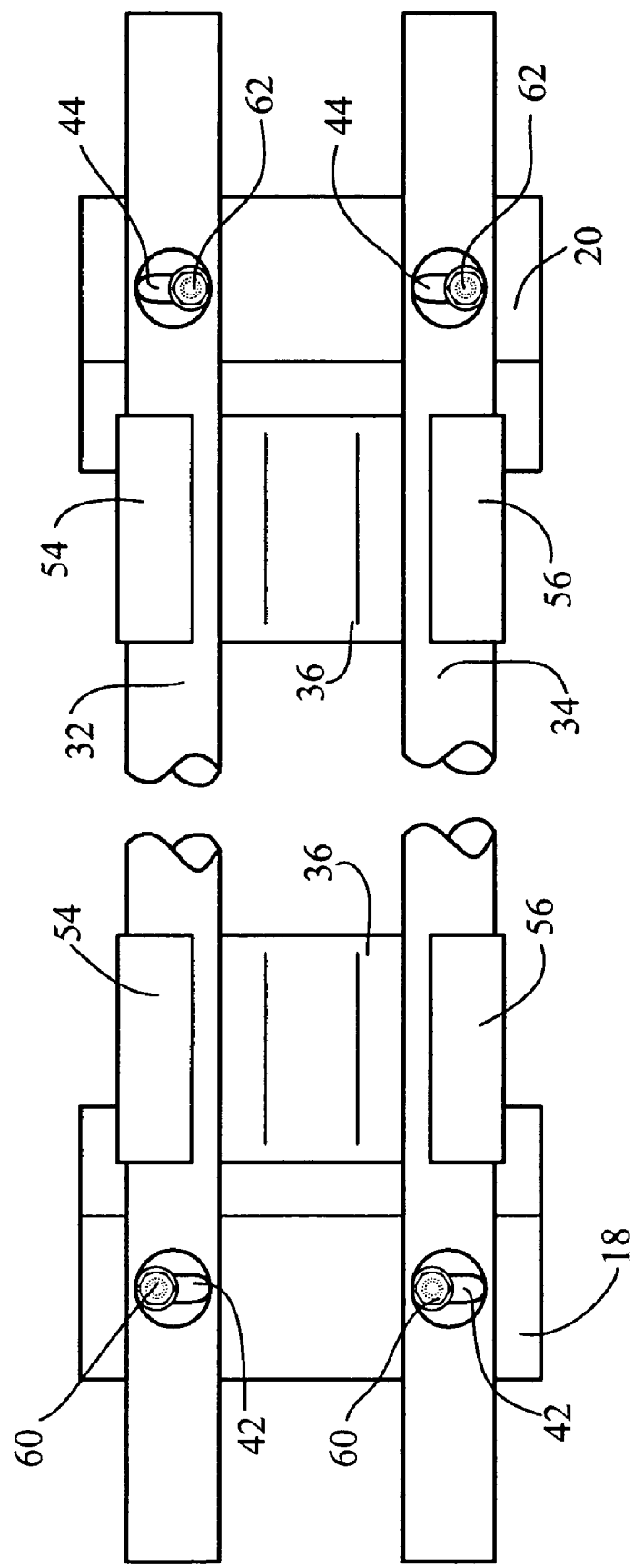
FIG. 8 is a fragmentary front elevational view of selected parts of the front vehicle bumper similar to FIG. 5, but on an enlarged scale, with the outer bumper cover and the compressible member removed to better show the offset between opposite side fasteners that fix the rigid reinforcing members to the mounting members in accordance with the present invention.

As mentioned above, the threaded apertures 24 in the first vehicle mounting member 18 are vertically offset by the distance D from the threaded apertures 26 in the second vehicle mounting member 20, as shown in FIGS. 9 and 10. The offset of the threaded apertures 24 and 26 provides the same offset D in the vertical relationship between the first and second fasteners 60 and 62, as shown in FIG. 5 and 8. Specifically, with the elongated energy absorbing structure 22 installed level with the vehicle 10, the first fasteners 60 are preferably located at the upper end 46 of the first vertically elongated retaining apertures 42 in each of the upper and lower rigid reinforcing members 32 and 34. Similarly, with the elongated energy absorbing structure 22 installed level with the vehicle 10, the second fasteners 62 are preferably located at the lower end 52 of the second vertically elongated retaining apertures 44 in each of the upper and lower rigid reinforcing members 32 and 34.

The locations of the first fasteners 60 at the upper ends 46 of the first vertically elongated retaining apertures 42 and the locations of the second fasteners 62 at the lower ends 52 of the second vertically elongated retaining apertures 44 predispose each of the upper and lower rigid reinforcing members 32 of the elongated energy absorbing structure 22 for torsional movement. Thus, as seen in FIG. 5, one end of each of the upper and lower rigid reinforcing members 32 and 34 will twist in a first torsional direction $T_1$ with respect to the center longitudinal axis and the other ends of the upper and lower rigid reinforcing members 32 and 34 will twist in a second torsional direction $T_2$. Specifically, the first fasteners 60 and the second fasteners 62 at their offset locations create a desirable attachment imbalance that encourages torsional displacement of the elongated energy absorbing structure 22 in response to a vehicular impact.

Further, the vertical length of the first and second vertically elongated retaining apertures 42 and 44 make sliding of the upper and lower rigid reinforcing members 32 and 34 with respect to the first and second vehicle mounting members 18 and 20 during torsional displacement possible. More specifically, in response to a vehicular impact, the upper and lower rigid reinforcing members 32 and 34 can slide with respect to the mounting members in response to torsional displacement. The upper and lower rigid reinforcing members 32 and 34 will slide with respect to the first and second fasteners 60 and 62 once the force applied is significant enough to overcome friction therebetween. Prior to sliding, the upper and lower rigid reinforcing members 32 and 34 and the compressible member 38 will likely undergo linear deformation, depending upon the impact and overall forces applied. Hence, the elongated energy absorbing structure 22 can undergo both linear displacement and torsional displacement in response to vehicular impact. The torsional displacement of the energy absorbing structure 22 reduces the amount of overall linear deformational displacement of the upper and lower rigid reinforcing members 32 and 34 in comparison to an identically constructed bumper in which the upper and lower rigid reinforcing members are rigidly attached to the first and second vehicle mounting members such that no torsional deformation occurs as in accordance with the present invention The outer bumper cover 40 is a conventional bumper cover shaped to conform to the body design of the vehicle 10. The outer bumper cover 40 can be formed of any of a variety of materials, such as plastic, composite materials or metal. The outer bumper cover 40 is attached to the vehicle 10 in a conventional manner, such as mechanical fasteners (not shown). Alternatively, the outer bumper cover 40 can be attached directly to the compressible member 38 in a conventional manner. The outer bumper cover 40 is preferably made of a resilient, flexible material that transmits forces from vehicular impacts to the compressible member 38.

Typically, conventional bumpers absorb energy with linear displacement in response to a vehicular impact. However, the present invention absorbs energy with both linear displacement and torsional displacement. By adding torsional displacement to the energy absorbing properties of the vehicle bumper 12, an increase in overall energy is realized. Specifically, the vehicle bumper 12 absorbs energy through linear displacement in a manner similar to conventional bumpers. However, the vehicle bumper 12 of the present invention also absorbs energy with torsional displacement. Therefore, an increase in energy absorption can be realized by the present invention over conventional designs due to torsional displacement characteristics of the vehicle bumper 12.

Second Embodiment

Figure 14:
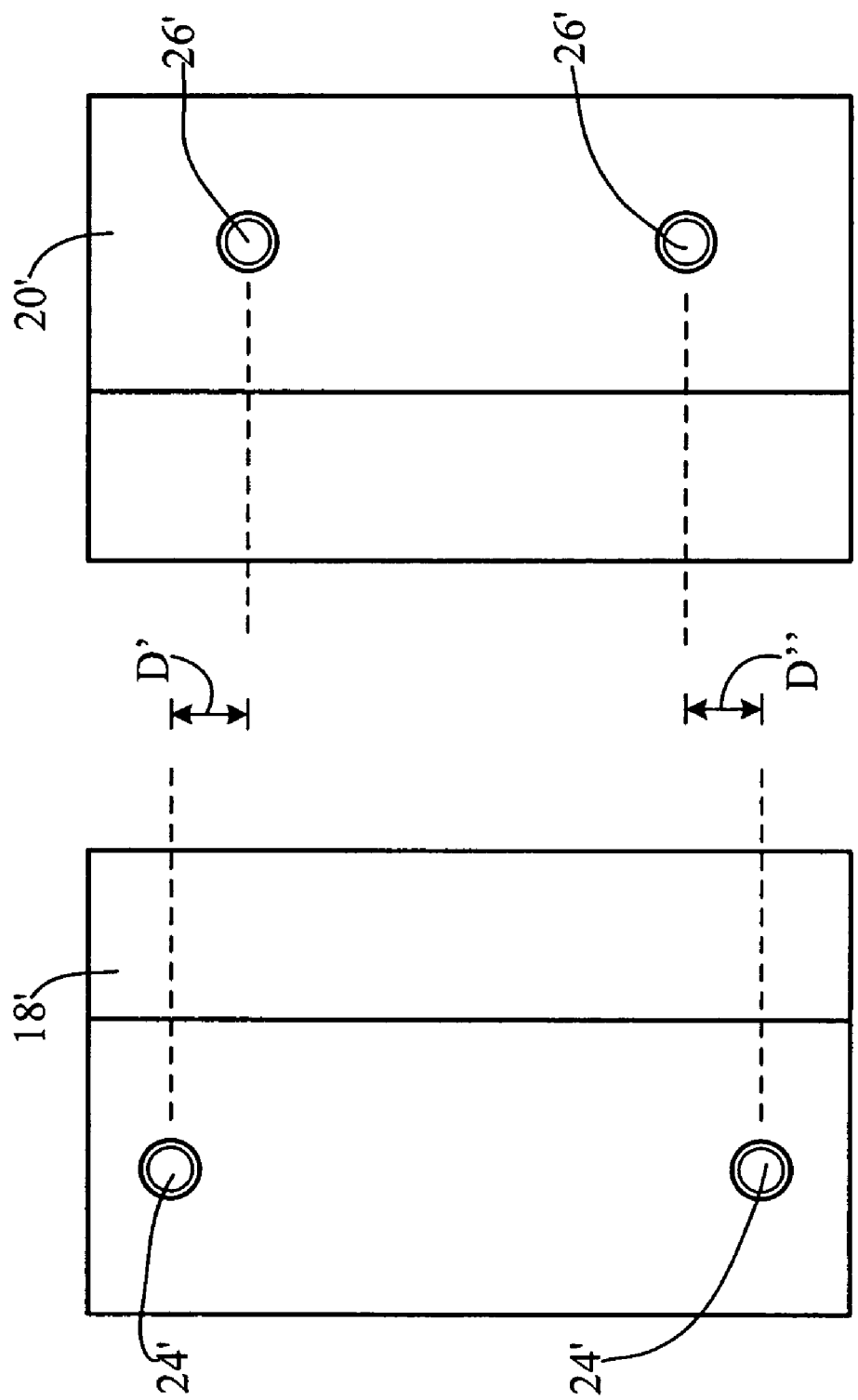
FIG. 14 is a front elevational view of the two mounting members showing offset threaded apertures in accordance with a second embodiment of the present invention.
Figure 15:
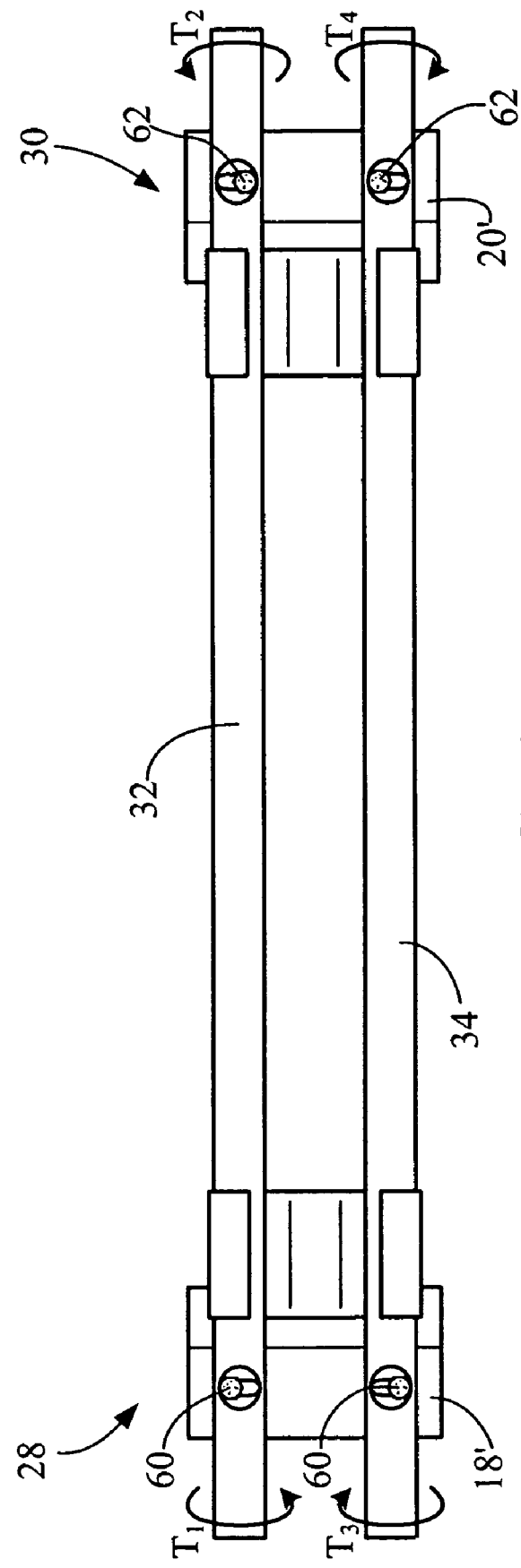
FIG. 15 is a front elevational view of selected parts of the front vehicle bumper with the outer bumper cover and the compressible member removed to show the rigid reinforcing members attached to the mounting members in accordance with the second embodiment of the present invention.
Figure 16:
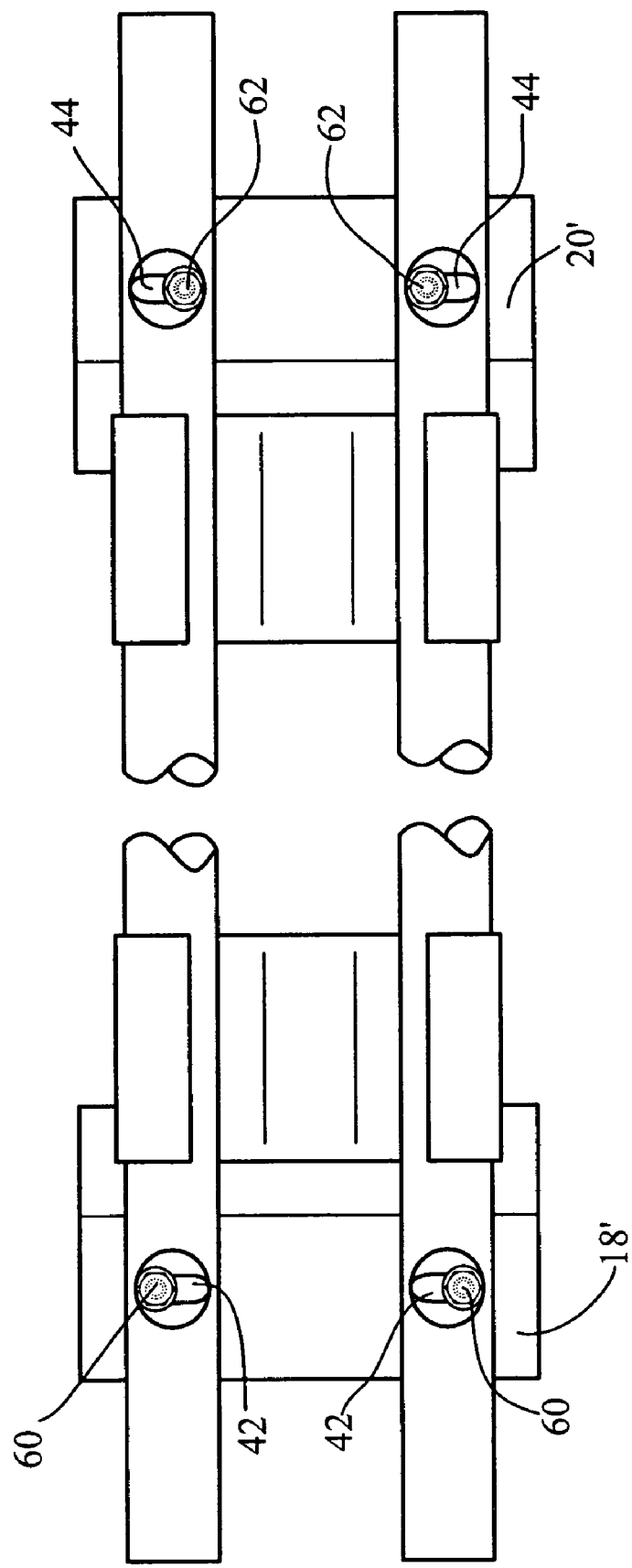
FIG. 16 is a fragmentary front elevational view of selected parts of the front vehicle bumper, similar to FIG. 15, but on an enlarged scale, with the outer bumper cover and the compressible member removed to better show the offset between the various fasteners that fix the rigid reinforcing members to the mounting members in accordance with the second embodiment of the present invention.

Referring now to FIGS. 14, 15 and 16, an elongated energy absorbing structure in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (') or a double prime (").

In the second embodiment, the first and second vehicle mounting members 18 and 20 of the first embodiment are replaced by first and second vehicle mounting members 18' and 20'. Otherwise, all elements of the second embodiment are identical to elements of the first embodiment. Consequently, only the first and second vehicle mounting members 18' and 20' are described below in detail along with effect new features of the first and second vehicle mounting members 18' and 20' have on other portions of the elongated energy absorbing structure The first vehicle mounting member 18' and the second vehicle mounting member 20' are shown side by side in FIG. 15 completely removed from the vehicle 10. The first vehicle mounting member 18' is formed with threaded apertures 24' and 24" and the second vehicle mounting member 20' is formed with threaded apertures 26' and 26".

On the first vehicle mounting member 18', the threaded apertures 24' is located proximate an upper end of the first vehicle mounting member 18'. The threaded aperture 24" is located proximate a lower end of the first vehicle mounting member 18'.

On the second vehicle mounting member 20', the threaded apertures 26' is spaced apart from an upper end of the second vehicle mounting member 20'. The threaded aperture 26" is spaced apart from a lower end of the second vehicle mounting member 20'. As a result, the threaded aperture 24' in the first vehicle mounting member 18' is vertically offset from the threaded aperture 26' in the second vehicle mounting member 20'. Specifically, the threaded aperture 24' is positioned vertically higher than the threaded aperture 26' by an offset distance D'. The threaded aperture 24" in the first vehicle mounting member 18' is also vertically offset from the threaded aperture 26" in the second vehicle mounting member 20'. However, the threaded aperture 24' is positioned vertically lower than the threaded aperture 26' by an offset distance D". In a preferred embodiment, D' is approximately equal to D". However, differing dimensions of D' and D" are alternatively employed.

As shown in FIGS. 15 and 16, the fasteners 60 and 62 that fix of the upper and lower reinforcing members 32 and 34 to the first vehicle mounting member 18' and the second vehicle mounting member 20' are positioned in accordance with the locations of the threaded apertures 24', 24", 26' and 26". Specifically, one of the fasteners 60 is positioned at the upper end of the first vertically elongated retaining aperture 42 of the upper rigid reinforcing member 32, as in the first embodiment. The other of the fasteners 60 is positioned at a lower end of the first vertically elongated retaining aperture 42 in the lower rigid reinforcing member 32. One of the fasteners 62 is positioned at the lower end of the second vertically elongated retaining aperture 44 of the upper rigid reinforcing member 32, as in the first embodiment. However, the other of the fasteners 62 is positioned at the upper end of the second vertically elongated retaining aperture 44 in the lower rigid reinforcing member 32.

Due to the configuration of the fasteners 60 and 62, the upper and lower rigid reinforcing members 32 and 34 are predisposed for torsional displacement in opposing torsional directions in response to vehicular impact on the bumper 12. Specifically, the fasteners 60 and 62 at opposite ends of the upper rigid reinforcing member 32 are offset from one another in order to predispose the upper rigid reinforcing members 32 to undergo torsional displacement in a predetermined first direction. The fasteners 60 and 62 in the lower rigid reinforcing member 34 are offset from one another in order to predispose the lower rigid reinforcing member 34 to undergo torsional displacement in a predetermined second direction. The predetermined first direction is opposite the predetermined second direction.

As shown in FIG. 15, in response to vehicular impact, the upper rigid reinforcing member 32 is predisposed to twist with torsional displacements $T_1$ and $T_2$. The lower rigid reinforcing member 34 is predisposed to twist with torsional displacements $T_3$ and $T_4$. The torsional displacements $T_1$ and $T_2$ are opposite the torsional displacement represented by the torsional displacements $T_3$ and $T_4$.

The bumpers 12 in accordance with the second embodiment of the present invention in response to vehicular impact are therefore able to undergo linear displacement and torsional displacement to absorb energy from the impact.

As used herein to describe the above embodiment, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±6% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle bumper comprising:
   a first vehicle mounting member and a second vehicle mounting member that are configured to be attached to a vehicle at horizontally spaced apart locations; and
   an elongated energy absorbing structure movably attached to both of the vehicle mounting members to linearly deform and torsionally deform with respect to the mounting members in response to a vehicular impact, the elongated energy absorbing structure including first and second vertically elongated retaining apertures at respective first and second ends with a first fastener disposed in the first vertically elongated retaining aperture and a second fastener disposed in the second vertically elongated retaining aperture.

2. The vehicle bumper as set forth in claim 1, wherein the first fastener is disposed adjacent an upper end of the first vertically elongated retaining aperture, and the second fastener is disposed adjacent a lower end of the second vertically elongated retaining aperture so that the first and second ends of the elongated energy absorbing structure slide in opposite relative directions with respect to the mounting members in response to the vehicular impact.

3. The vehicle bumper as set forth in claim 2, wherein the first and second vertically elongated retaining apertures are horizontally aligned.

4. The vehicle bumper as set forth in claim 1, wherein the first and second vertically elongated retaining apertures are horizontally aligned, with the first fastener being vertically offset from the second fastener.

5. The vehicle bumper as set forth in claim 1, wherein the elongated energy absorbing structure includes a rigid reinforcing member movably fastened to both of the vehicle mounting members and a compressible member disposed at least primarily on an opposite side of the rigid reinforcing member from the vehicle mounting members, with the compressible member being constructed of a more easily deformable material than the rigid reinforcing member.

6. The vehicle bumper as set forth in claim 5, wherein the compressible member at least partially encapsulates the rigid reinforcing member.

7. The vehicle bumper as set forth in claim 5, wherein the compressible member is a foam material.

8. The vehicle bumper as set forth in claim 5, wherein the compressible member is an elastically compressible material and the rigid reinforcing member is a plastically deformable material.

9. The vehicle bumper as set forth in claim 5, wherein the rigid reinforcing member includes first and second vertically elongated retaining apertures at first and second ends, respectively, with a first fastener disposed in the first vertically elongated retaining aperture and a second fastener disposed in the second vertically elongated retaining aperture.

10. The vehicle bumper as set forth in claim 9, wherein the first fastener is disposed adjacent an upper end of the first vertically elongated retaining aperture, and the second fastener is disposed adjacent a lower end of the second vertically elongated retaining aperture so that the first and second ends of the rigid reinforcing member slide in opposite relative directions with respect to the mounting members in response to the vehicular impact.

11. The vehicle bumper as set forth in claim 10, wherein the first and second vertically elongated retaining apertures are horizontally aligned.

12. The vehicle bumper as set forth in claim 9, wherein the first and second vertically elongated retaining apertures are horizontally aligned, with the first fastener being vertically offset from the second fastener.

13. The vehicle bumper as set forth in claim 1, wherein the energy absorbing structure includes an upper rigid reinforcing member and a lower rigid reinforcing member that extend generally parallel to one another in a generally horizontal direction and that are fixedly attached to the vehicle mounting members to twist with respect to the mounting members in response to the vehicular impact.

14. The vehicle bumper as set forth in claim 13, wherein the upper and lower rigid reinforcing members are retained in a vertically spaced apart relationship with respect to the mounting members.

15. The vehicle bumper as set forth in claim 14, wherein the energy absorbing structure further includes at least one connector element coupled between the upper and lower rigid reinforcing members to maintain the upper and lower rigid reinforcing members in the vertically spaced apart relationship without restraining rotational movement of the upper and lower rigid reinforcing members during the vehicular impact.

16. The vehicle bumper as set forth in claim 13, wherein the energy absorbing structure further includes a compressible member disposed at least primarily on an opposite side of the upper and lower rigid reinforcing members from the vehicle mounting members, with the compressible member being constructed of a more easily deformable material than the upper and lower rigid reinforcing members.

17. The vehicle bumper as set forth in claim 13, wherein each of the upper and lower rigid reinforcing members includes first and second vertically elongated retaining apertures at first and second ends, respectively, with a first fastener disposed in the first vertically elongated retaining aperture of each of the upper and lower rigid reinforcing members and a second fastener disposed in the second vertically elongated retaining aperture of each of the upper and lower rigid reinforcing members.

18. The vehicle bumper as set forth in claim 17, wherein the first fasteners are disposed adjacent one end of a respective one of the first vertically elongated retaining apertures, and the second fasteners are disposed adjacent an opposite end of a respective one of the second vertically elongated retaining apertures relative to the first fasteners of a respective one of the upper and lower rigid reinforcing members so that the first and second ends of each of the upper and lower rigid reinforcing members slide in opposite relative directions with respect to the mounting members in response to the vehicular impact.

19. The vehicle bumper as set forth in claim 18, wherein the first and second vertically elongated retaining apertures of each of the upper and lower rigid reinforcing members, respectively, are horizontally aligned.

20. The vehicle bumper as set forth in claim 17, wherein the first and second vertically elongated retaining apertures of each of the upper and lower rigid reinforcing members, respectively, are horizontally aligned, with the first fasteners being vertically offset from the second fasteners in each of the upper and lower rigid reinforcing members, respectively.

* * * * *